(12) United States Patent
Hahn et al.

(10) Patent No.: US 8,001,020 B2
(45) Date of Patent: *Aug. 16, 2011

(54) BUDGETARY LEDGER

(75) Inventors: Wolfgang Hahn, Washington, DC (US); Frank Godeby, Bethesda, MD (US)

(73) Assignee: SAP AG, Walldorf (DE)

( * ) Notice: Subject to any disclaimer, the term of this patent is extended or adjusted under 35 U.S.C. 154(b) by 62 days.

This patent is subject to a terminal disclaimer.

(21) Appl. No.: 12/545,464

(22) Filed: Aug. 21, 2009

(65) Prior Publication Data

US 2009/0313149 A1     Dec. 17, 2009

Related U.S. Application Data

(63) Continuation of application No. 10/747,143, filed on Dec. 30, 2003, now Pat. No. 7,599,865.

(51) Int. Cl.
*G07B 17/00* (2006.01)

(52) U.S. Cl. .................. 705/30; 705/24; 705/34

(58) Field of Classification Search .................. None
See application file for complete search history.

(56) References Cited

U.S. PATENT DOCUMENTS

| | | | |
|---|---|---|---|
| 6,041,312 A * | 3/2000 | Bickerton et al. | 705/36 R |
| 6,058,375 A * | 5/2000 | Park | 705/30 |
| 6,343,279 B1 * | 1/2002 | Bissonette et al. | 705/41 |
| 6,460,069 B1 * | 10/2002 | Berlin et al. | 709/201 |
| 6,532,450 B1 * | 3/2003 | Brown et al. | 705/40 |
| 7,120,597 B1 * | 10/2006 | Knudtzon et al. | 705/30 |
| 7,263,527 B1 * | 8/2007 | Malcolm | 707/102 |
| 2001/0051917 A1 * | 12/2001 | Bissonette et al. | 705/30 |
| 2002/0010612 A1 * | 1/2002 | Smith et al. | 705/8 |
| 2002/0138376 A1 * | 9/2002 | Hinkle | 705/30 |
| 2003/0046194 A1 * | 3/2003 | McClendon et al. | 705/30 |
| 2003/0061130 A1 * | 3/2003 | Hoffman et al. | 705/30 |
| 2005/0038721 A1 * | 2/2005 | Goeckel et al. | 705/30 |
| 2005/0137946 A1 * | 6/2005 | Schaub et al. | 705/30 |
| 2005/0137947 A1 * | 6/2005 | Schaub et al. | 705/30 |
| 2009/0018935 A1 * | 1/2009 | Neumaier et al. | 705/30 |
| 2009/0030819 A1 * | 1/2009 | VanLeeuwen | 705/30 |

\* cited by examiner

*Primary Examiner* — F. Ryan Zeender
*Assistant Examiner* — Fateh M Obaid
(74) *Attorney, Agent, or Firm* — Kenyon & Kenyon LLP

(57) ABSTRACT

A system and method for maintaining budget related transactions in a financial management system. A financial management system may include a general ledger to maintain account balances and a budgetary ledger to maintain account balances only for budget related transactions. The budgetary ledger may generate a budgetary ledger document, which contains budget related transactions. The budgetary ledger may further include a core to enable generation of the budgetary ledger document, and an extension to define rules associated with generation of the budgetary ledger document. The budgetary ledger may then post the budgetary ledger document to the general ledger.

15 Claims, 7 Drawing Sheets

BUDGETARY LEDGER

CROSS-REFERENCE TO RELATED APPLICATIONS

This application is a continuation of and claims priority under 35 U.S.C. §120 to U.S. patent application Ser. No. 10/747,143, filed on Dec. 30, 2003, and entitled "Budgetary Ledger," which is herein incorporated by reference in its entirety.

BACKGROUND

Embodiments of the present invention relate to computerized accounting systems and, more particularly, to such systems that operate pursuant to specialized accounting procedures that might be required, for example, by governmental agencies and the like.

Public sector organizations such as government agencies are required to record their financial transactions with a greater degree of specificity than, for example, private firms. Thus, accounting procedures that govern the records for private firms are not completely satisfactory for these public sector organizations because they record incomplete information regarding the organizations' activity. In a private firm, for example, only the actuals may be recorded on a general ledger. A government agency, however, may be expected to also record budget related activities on the general ledger. In the United States, regulations promulgated pursuant to the Joint Financial Management Improvement Program (JFMIP) define the accounting procedures for such entities.

Many Enterprise Resource Planning (ERP) vendors sell to these government agencies various computerized financial products, which are designed to support their financial management. Often, these financial products create financial documents from original transaction documents for accounting purposes. These financial documents are required to conform to the accounting procedures, such as the JFMIP, imposed on the government agency. Among various financial products provided by ERP vendors, a budgetary ledger is one of the most often tested components in selecting one of these financial products. Often, the budgetary ledger maintains account balances for budget relevant processes or transactions. The budgetary ledger is typically interactive with a general ledger, which maintains account balances for not only the budget relevant transactions, but also the actuals, receivables, and other types of transactions, to ensure that the agency is managing the funds pursuant to defined limitations. Put differently, the budgetary ledger may post budget relevant transactions to the general ledger to maintain account balances for budget related transactions.

SAP AG, the assignee of the present invention, included a budgetary ledger unit in prior versions of its R/3 product that handled the reporting requirements for governmental organizations. The budgetary ledger unit, however, was deemed cumbersome for its users. For each transaction, the budgetary ledger unit required an operator to manually cycle through a master configuration table to selectively indicate which of a universe of possible predecessor conditions apply to a given reporting requirement and to derive applicable accounts. FIG. 1 is an illustration of an exemplary master configuration table used by the budgetary ledger unit in prior versions of its R/3 product. The table has seventeen different data fields for each transaction. The budgetary ledger has to maintain values for all of the seventeen data fields, and compares each transaction against all of the data fields to determine relevant accounts. As a result, only one or two relevant accounts are typically expected. Thus, it is very difficult to set up and maintain the configuration table. It is cumbersome and time consuming to perform the account derivation using the master configuration table. Further, this budgetary ledger unit is suitable for use with only one nation's reporting requirements (currently, the United States). Although other nations are instituting similar recording requirements or are expected to do so, the prior version of the R/3 product is not suited for ready extension to accommodate such reporting requirements.

Accordingly, there is a need in the art for a computerized accounting system that provides for easy configuration of public sector reporting requirements and is readily applicable to multiple different recording policies.

DETAILED DESCRIPTION

Embodiments of the present invention provide a computerized accounting system that satisfies the enhanced reporting requirements that are defined for public sector organizations. One embodiment of the present invention comprises dividing the budgetary ledger into two components, a core and an extension set. The core provides services necessary to call a general ledger (or an accounting interface) of the system. The extension performs account derivation. By dividing the services necessary to create budgetary ledger documents, embodiments of the present invention provide a flexible and user convenient way to configure a budgetary ledger. This structure also permits extension to other reporting requirements by changing only the extension set. The two systems cooperatively determine, from transaction data, how many different accounts there are to record the transaction.

Figure 2:
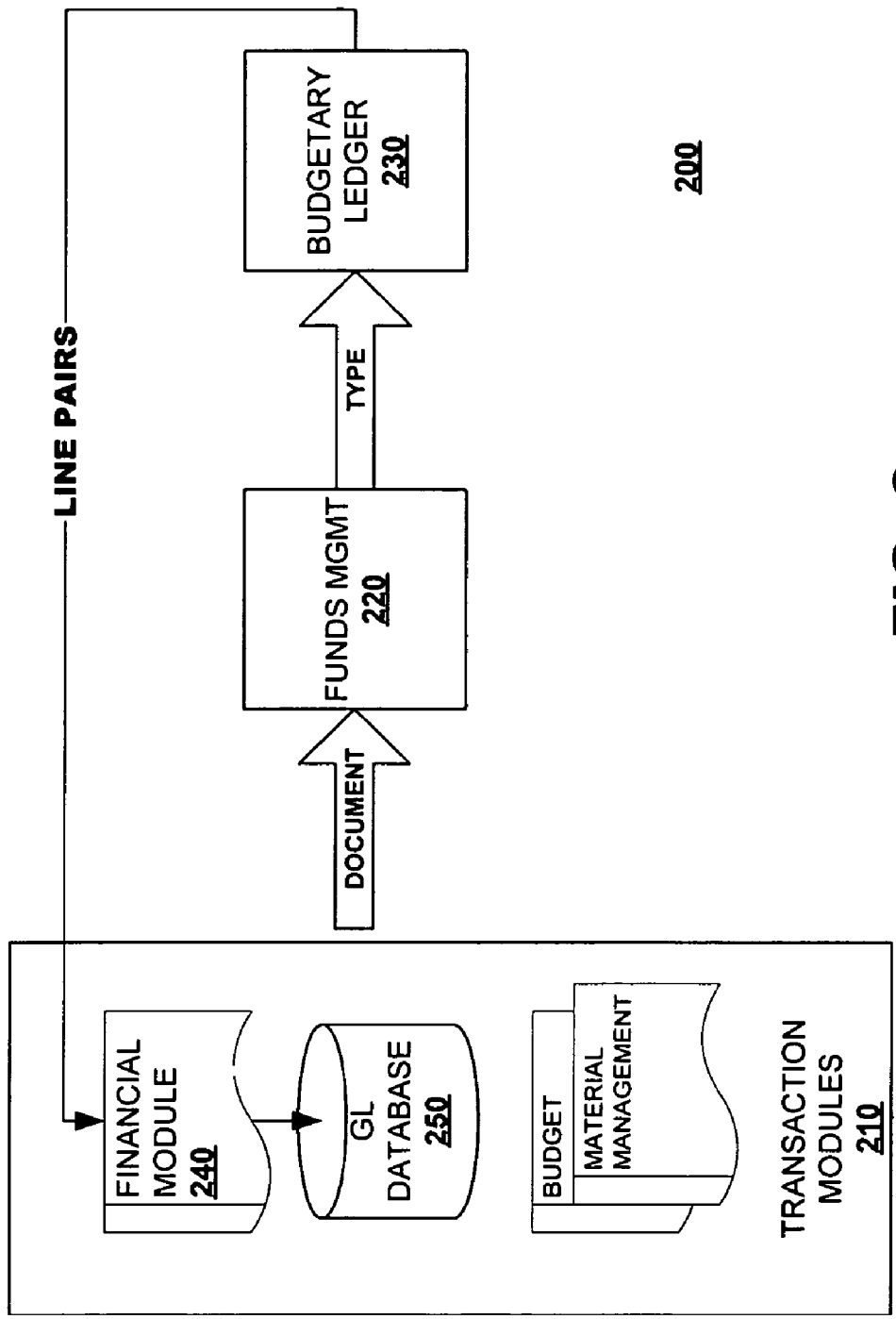
FIG. 2 illustrates a budgetary management system operating in accordance with embodiments of the invention.

FIG. 2 illustrates a typical budget management system 200 according to an embodiment of the present invention. The budget management system 200 may be provided as a component of a larger financial management system. The budget management system 200 may include transaction modules 210, such as a material management module, a financial module, and a budget module. These transaction modules 210 may process data representing various transactions that an organization performs during the usual course of business such as payrolls, budgeting, purchase requisitions, purchase orders, goods receipts, invoices, and the like. Typically, the computer systems record these transactions in "documents." The original transaction documents generally include data representing one or more transactions being performed by a public sector organization. These original transaction documents are fed into a funds management unit 220, which determines whether the organization possesses sufficient funds for such transactions.

In general, the funds management unit 220 may verify that the funds to be distributed do not exceed the amount of funds available for allotment or sub-allotment at a given distribution level. To do so, the funds management unit 220 may record related budgetary documents and control the use of funds against appropriation and administrative limitations. The funds management unit 220 also may record and control the types of budgetary authority, including appropriations, spending authority, and borrowing authority. Thus, when the original transaction documents from the various transaction modules 210 are received, the funds management unit 220 may check each document and may determine whether the organization possesses sufficient funds for a particular transaction.

The budgetary ledger unit 230 determines whether transactions are to be recorded in the general ledger database 250. The budgetary ledger unit 230 compares transaction data to various transaction conditions to determine if they are to be recorded. If so, the budgetary ledger unit 230 identifies accounts to which the transactions are to be recorded and generates "line pairs" for recording in a budgetary ledger document. The budgetary ledger document may be stored in a financial module 240. The financial module 240 then posts the budgetary ledger document to the general ledger database 250. The general ledger database 250, among others, creates a history of budgetary ledger information.

Figure 3:
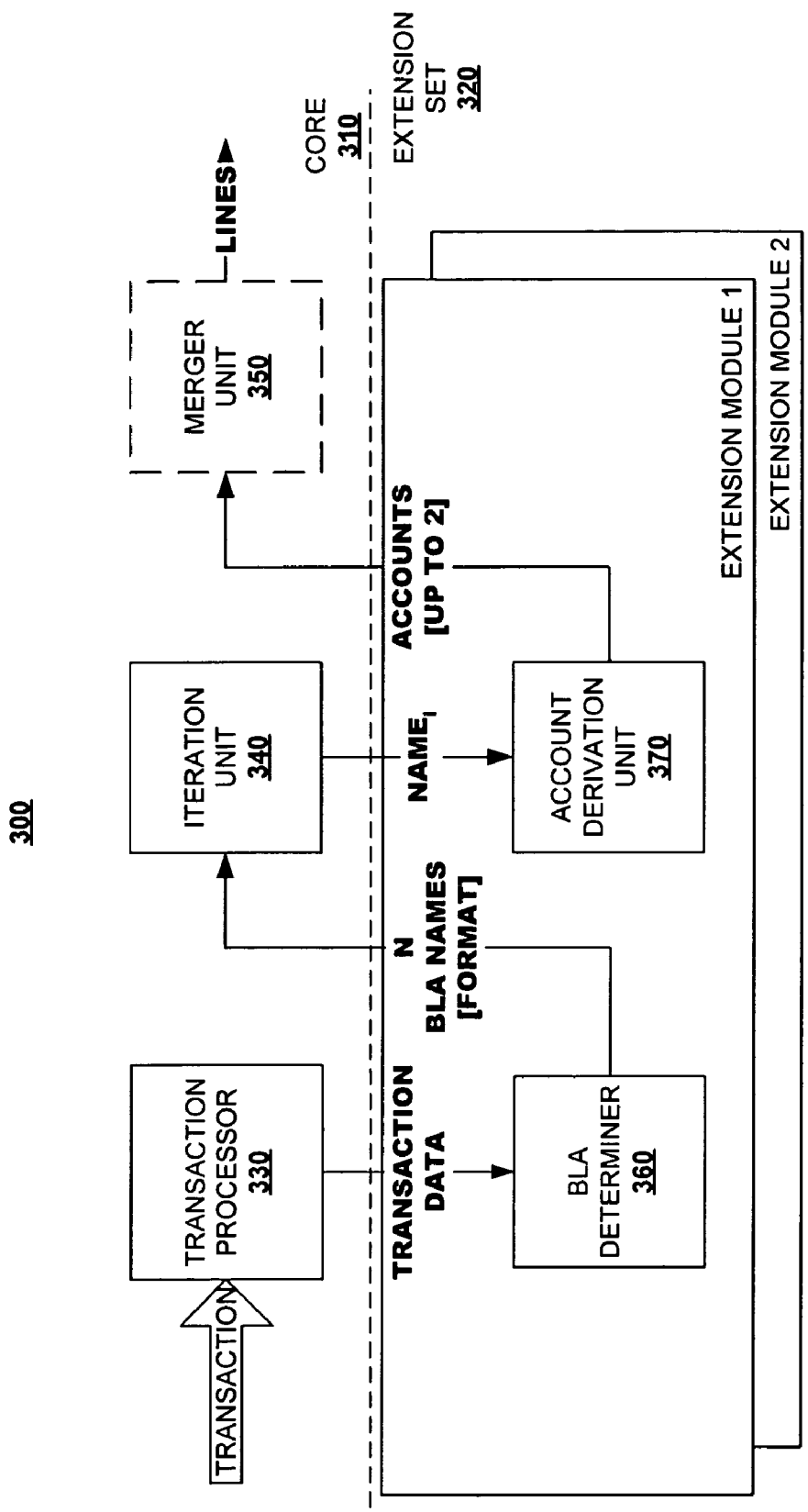
FIG. 3 illustrates an exemplary budgetary ledger structure according to an embodiment of the present invention.

FIG. 3 is a functional block diagram of a budgetary ledger 300 according to an embodiment of the present invention. The budgetary ledger 300 may include a core 310 and an extension set 320. The core 310 may administer the creation of account "line pairs" for recording and may maintain the consistency of the resulting budgetary ledger document. The extension set 320 may tailor operation of the budgetary ledger 300 for operation in a given accounting scheme. For example, one extension set may define reporting policies and accounts for U.S. governmental agencies. Another extension set may define corresponding policies and accounts for governmental agencies of other nations. By engaging an appropriate extension module, one may tailor the operation of the budgetary ledger system 300 for any number of prescribed reporting policies. Furthermore, the structure of this embodiment may ease the set up and maintenance of the budget related transaction data pursuant to the reporting policies. Thus, embodiments of the present invention may provide a user convenient tool to configure the budgetary ledger area.

In an embodiment, the core 310 may further include a transaction processor 330, an iteration unit 340 and a merger unit 350. The extension set 320 may include a budgetary ledger area determiner 360 and an account derivation unit 370. These units cooperate to develop account line pairs from transaction documents generated by a funds management unit.

The transaction processor 330 defines an interface to the funds management unit and the budgetary ledger area determiner 360. From a document, the transaction processor 330 may identify various transactions represented therein. Once the document is received, the transaction processor 330 may determine which transaction(s) in the document require reporting to the general ledger based on their transaction data. For each transaction to be reported, the transaction processor 330 then may forward appropriate transaction data, such as a transaction type, a value type, and the like, to the budgetary ledger area determiner 360. As previously mentioned, the document may be payment documents, down payment documents, invoices, goods receipts, purchase orders, commitments, travel requests, sales and distribution orders, forecasts of revenue, purchase requisitions, pre-commitments, funds reservations, and the like.

The budgetary ledger area determiner 360 may receive the transaction data from the transaction processor 330. The budgetary ledger area determiner 360 may then determine which budgetary areas the document falls into. A budgetary ledger area is a collection of accounts that are associated with a higher-level business process. The budgetary ledger area may typically be defined with a budgetary ledger area name and a predetermined set of accounts.

The budgetary ledger area determiner 360 may provide a table/list that includes triggering conditions for each budgetary ledger area. The triggering conditions must be satisfied for a particular transaction to be reported in a given budgetary ledger area. For example, such triggering conditions may be defined by the type of fund, the timing of the transaction, and the like. A transaction in the document may hit one or more different budgetary ledger areas so long as the transaction satisfies the triggering conditions defined for these budgetary ledger areas. For example, a transaction involving a computer purchase in a purchase order may fall into both the "Expended Appropriations" budgetary ledger area and the "Miscellaneous Receipt" budgetary ledger area. As a result, the budgetary ledger area determiner 360 may return the number of the budgetary ledger areas that each transaction in the document hits and the names of identified budgetary ledger areas.

The iteration unit 340 may receive the identified number of budgetary ledger areas, their names, and the transaction data associated with each transaction in the document from the budgetary ledger area determiner 360. For each hit in the budgetary ledger area, the iteration unit 340 may call for the account derivation unit 370 using the budgetary ledger area name. For example, if one transaction of the document falls into two budgetary ledger areas, the iteration unit 340 calls the account derivation unit 370 two times, once for each budgetary ledger area. Each time the account derivation unit 370 is called, it may perform account derivation for the given budgetary ledger area.

The account derivation unit 370 may receive the budgetary ledger area name and the transaction data from the iteration unit 340. The account derivation unit 370 may then determine the associated account(s) to which the transaction is to be recorded and generate a line or a line pair for recording in the identified account(s). Each budgetary ledger area may require different logic for the account derivation and usually different account ranges. The logic for determining the budgetary ledger area, to where each transaction of the document has to be posted, may be different from the logic for deriving the associated accounts. As a result of the account derivation, the account derivation unit 370 may retrieve up to two accounts.

In one embodiment, once the line or line pair is generated in the accounts, these accounts may be stored in a budgetary ledger document. The budgetary ledger document is then stored in the financial module, which forwards it to the general ledger database.

In another embodiment, a merger unit 350 may be connected to the account derivation unit 370 and may define an interface to the financial module. The merger unit 350 may receive the accounts that are associated with each budgetary ledger area. Once all the accounts relating to all of the budgetary ledger areas are received, the merger unit 350 may then determine if any accounts may be merged together. The merger unit 350 may also determine if any accounts from different transaction documents could be merged together. Whether two accounts may be merged will be governed by the accounting procedures imposed on a particular agency. If permitted, the merger unit 350 may sum up the values of matching accounts. The merger unit 350 may, in turn, reduce the number of line pairs in the budgetary ledger document, and facilitate easier maintenance of the budgetary information.

Figure 4:
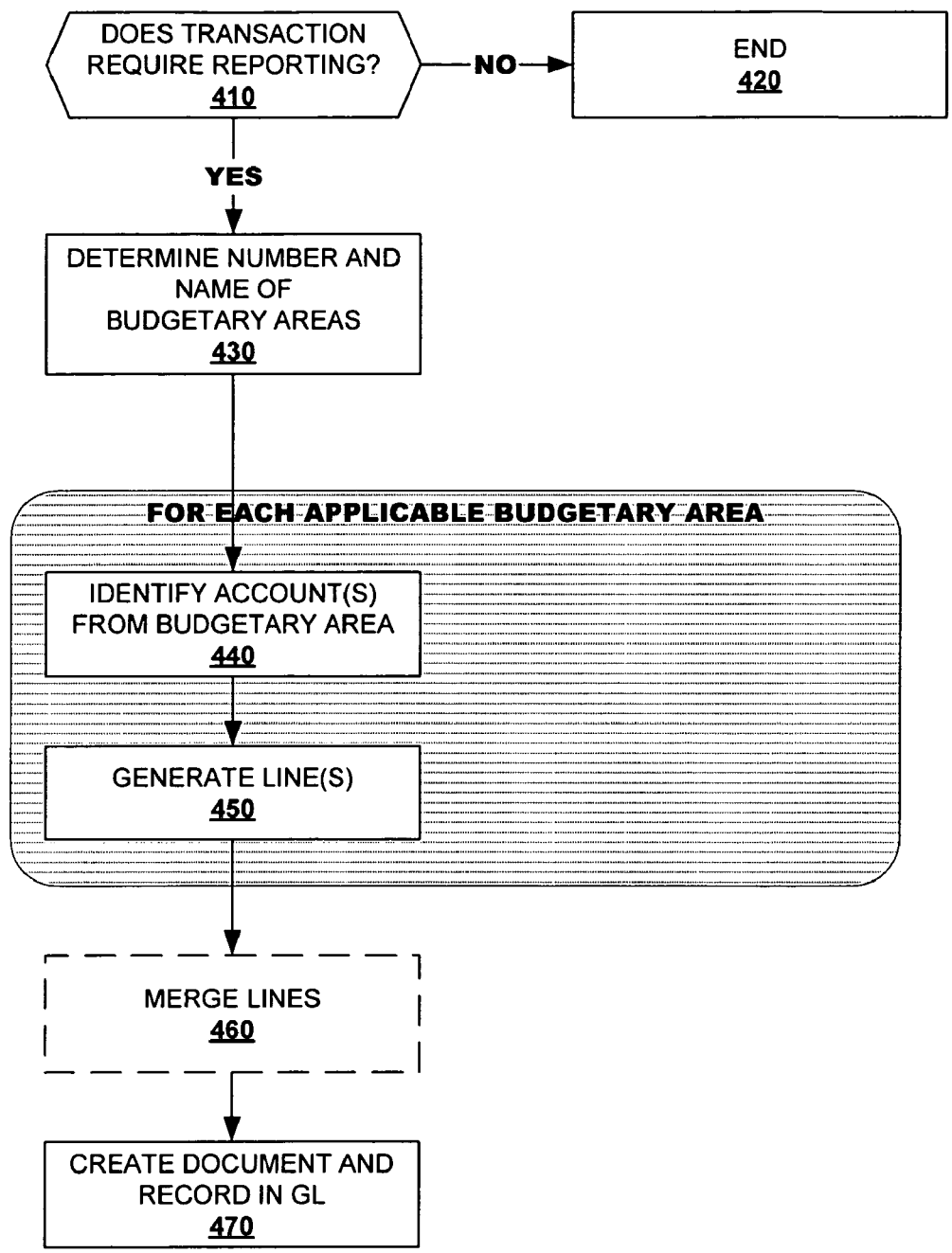
FIG. 4 illustrates a method for budgetary transaction management using the budgetary ledger shown in FIG. 3 according to an embodiment of the present invention.

FIG. 4 illustrates a method of generating budgetary line pairs according to one embodiment of the present invention.

Responsive to the transaction data and the identified transaction type(s), the method may determine if the transaction requires reporting (box 410). If not, the method may perform no further actions (box 420). If so, the method may compare the transaction data to the budgetary ledger area triggering conditions. As previously mentioned, some transactions may require reporting in more than one budgetary ledger areas. Thus, when the transaction requires reporting, the method may determine which budgetary ledger areas the transaction falls into and the names of identified budgetary ledger areas (box 430).

For each hit in the budgetary ledger areas, the method may identify the associated account(s) within the budgetary ledger area (box 440). Different transactions may be related to different number of accounts. Embodiments of the present invention may fall within two general cases:
the transaction may be related to one account, and thus, may create exactly one account document line when the document is self-balanced; and
the transaction may be related to two accounts, and thus, may create a line pair, one line in each of the two accounts, for balancing purposes.
Typically, most transactions require two lines to be generated. Thus, the method may then generate a line in each of the identified account(s) (box 450). The method repeats the process of identifying associated account(s) and generating a line or line pair for each of the identified budgetary ledger area.

Optionally, once the line or line pair is generated in the identified accounts, the method may determine if it may be merged with any other line with the same account (box 460). The agency's reporting will govern whether a given transaction may be posted individually or as a summary. If it is allowed to post some transactions as a summary, the merged line is applied to a specified account and a budgetary ledger document is created therefrom (box 470).

A representative example for generation of a budgetary ledger document according to an embodiment of the present invention is set forth below with reference to FIG. 3. Consider a transaction which creates two original documents with three line items listed as follows:

| DOCUMENT | LINE ITEM | AMOUNT | TRANSACTION DATA |
|---|---|---|---|
| 1 | 1 | $100 | Cost Center = "X", Fund = "A" |
|   | 2 | $150 | Cost Center = "Y", Fund = "B" |
| 2 | 1 | $200 | Cost Center = "Z", Fund = "B" |

When this information is received, the transaction processor 330 may determine if the transaction calls for reporting. If any transaction data requires posting, the transaction processor 330 may call the extension 320 by sending the associated transaction data to the budgetary ledger area determiner 360.

Figure 5:
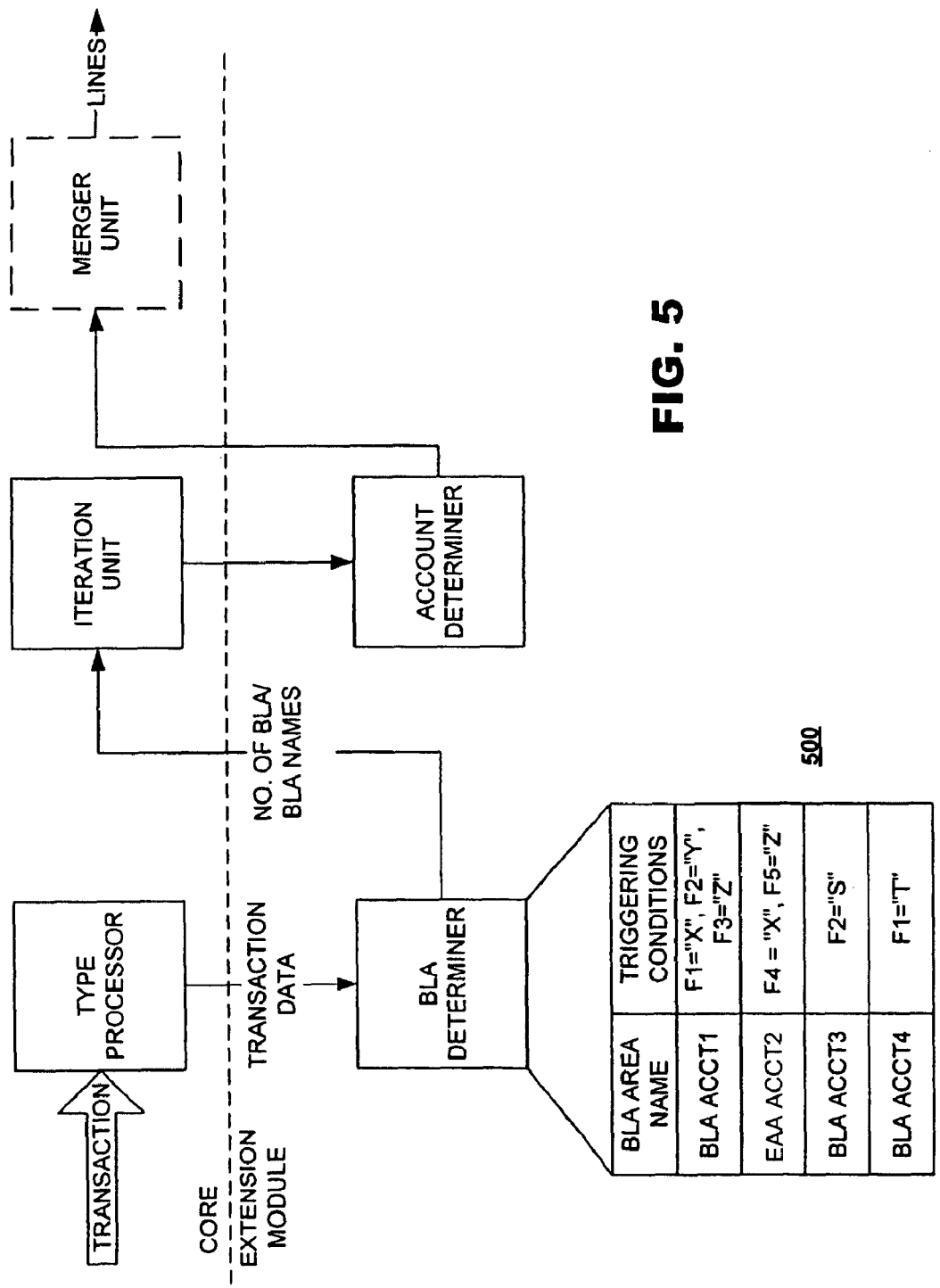
FIG. 5 illustrates an exemplary budgetary ledger area determination according to an embodiment of the present invention.

When the budgetary ledger area determiner 360 receives the transaction data, it may determine which budgetary ledger areas the transaction falls into. FIG. 5 illustrates an exemplary budgetary ledger area determination according to one embodiment of the present invention. During the budgetary ledger area determination, the budgetary ledger area determiner 360 may determine whether line item 1 of document 1 satisfies triggering conditions for BLA, EAA, and any other budgetary ledger areas in a given extension module 320. The budgetary ledger area determiner 360 repeats this determination for each line item of the document received from the core 310. As illustrated in FIG. 5 as a representative example, line item 1 of document 1 may hit two budgetary ledger areas, BLA and EAA (table 500). The other line items may only hit one budgetary ledger area, BLA (table 500). Once the associated budgetary ledger area(s) is determined, the budgetary ledger area determiner 360 may return the number of budgetary ledger area(s) and their names, along with the transaction data, to the iteration unit 340. An exemplary budgetary ledger area determination may yield the following result:

| DOCUMENT | LINE ITEM | Triggering Condition | BUDGETARY LEDGER AREA | NO. of BUDGETARY LEDGER AREA(S) |
|---|---|---|---|---|
| 1 | 1 | Fund = "A" | BLA, EAA | 2 |
|   | 2 | Fund = "B" | BLA | 1 |
| 2 | 1 | Fund = "B" | BLA | 1 |

For each transaction type, the iteration unit 340 may then call the account derivation unit 370 for each hit in the budgetary ledger area determiner 360. Using the above example, for document 1, the iteration unit 340 may call the account derivation unit 370 two times for the first line item—one for BLA and another for EM, and once for the second line. The iteration unit 340 then repeats calling the account derivation unit 370 for each line item of the documents. Thus, the iteration unit 340 may call the account derivation unit 370 only one time for document 2. For each budgetary ledger area, the account derivation unit 370 may then identify the associated account(s) from the budgetary area. An exemplary account derivation may yield:

| TRANSACTION | LINE ITEM | AMOUNT | TRANSACTION DATA | NO. BLAS | BLA NAME | ACCOUNT |
|---|---|---|---|---|---|---|
| 1 | 1 | $100 | Fund = "A" Cost Center = 'X' | 2 | BLA | ACCT1A ACCT1B |
|   |   |   |   |   | EAA | ACCT2A ACCT2B |
|   | 2 | $150 | Fund = "B", Cost Center = 'Y' | 1 | BLA | ACCT3A ACCT3B |
| 2 | 1 | $200 | Fund = "B", Cost Center = 'Z' | 1 | BLA | ACCT4A ACCT4B |

Figure 6:
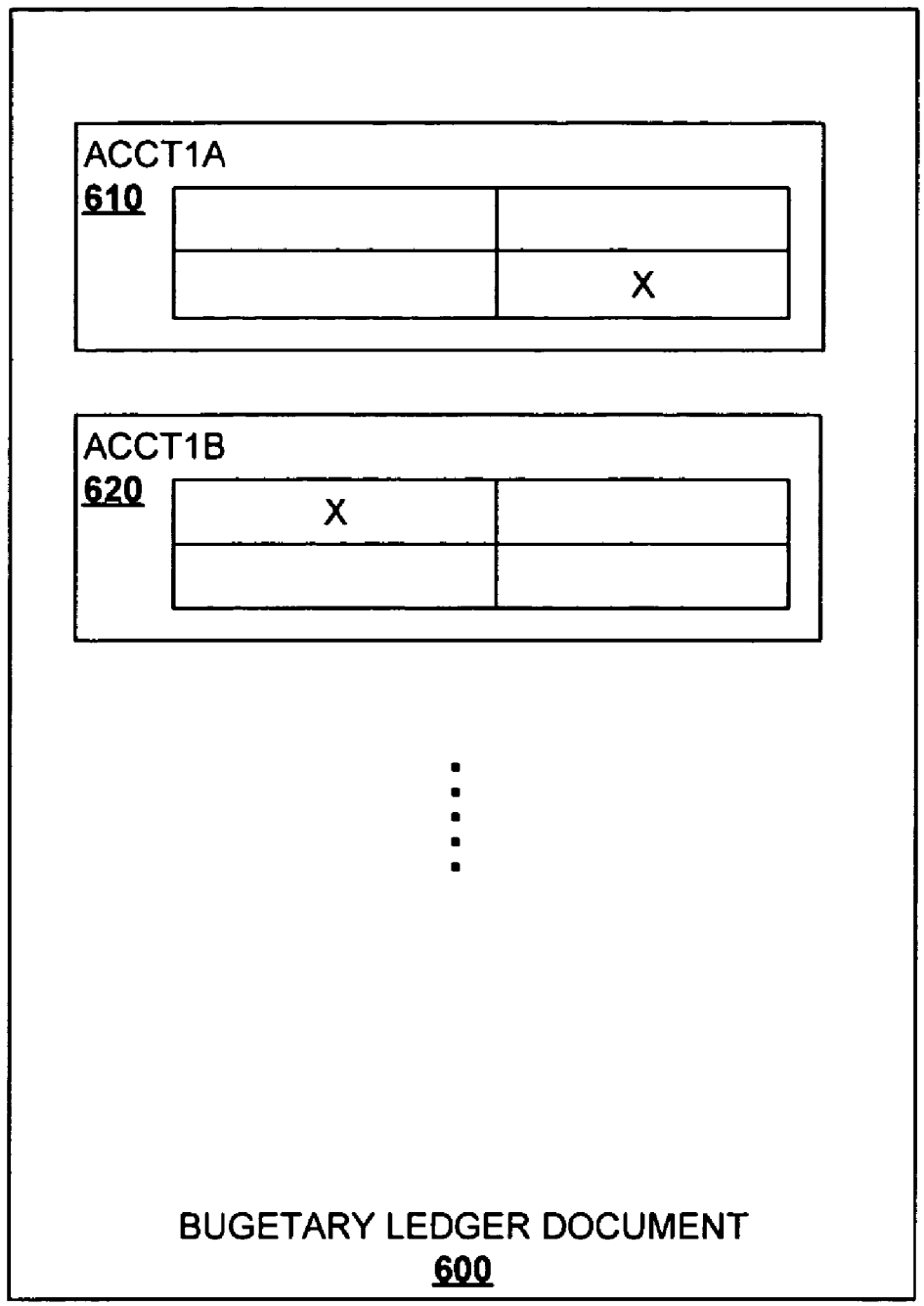
FIG. 6 illustrates an exemplary line pair generation according to an embodiment of the present invention.

Once the account(s) is identified, the account derivation unit may generate a line in each of the identified accounts. FIG. 6 illustrates an exemplary budgetary ledger document 600, which includes a line pair generated in its associated accounts according to one embodiment of the present invention. For example, for line item 1 of document 1, a line pair is generated, one in ACCT1A 610 and another in ACCT1B 620 for balancing purposes.

Optionally, after the account derivation, the merger unit 350 may determine whether any lines can be merged together if the agency's reporting allows postings as a summary. Particularly, the merger unit 350 may determine whether there are any lines that fall into the same account in the same budgetary area. If so, the identified lines are merged together. For example, consider a purchase order having one transaction with two lines—$100 for a Battery paid by Cost Center "X", Fund "A" and $150 for a Monitor paid by Cost Center "Y", Fund "B." Each line of the purchase order goes trough the process described above. If, for example, each line falls into two budgetary ledger areas, and each budgetary area creates two accounts, a total of eight lines may be generated. These eight lines may be merged by the merger unit 350, which sums up the values of matching accounts.

These lines may then be stored in a specified account. A budgetary ledger document is then created from the resulting accounts. The budgetary ledger document is then forwarded to the financial module of the accounting system. The financial module may store it in the general ledger database.

By dividing the budgetary ledger 300 into the core 310 and the extension 330, embodiments of the present invention may provide a user convenient tool to post budgetary transactions. The core 310 may determine whether a budgetary ledger document may be created, call the extension to determine the associated budgetary ledger areas, call the accounting derivation unit 370 to determine the associated accounts and to generate line pairs, and merge the related lines that might be combined together. The extension 320, on the other hand, may determine how many/what budgetary ledger areas each transaction hits, the associated accounts, and the required number of lines to be generated. It should be noted that the core 310 may not run without the extension 320, and the extension 320 may not run without the core 310. This two-tier architecture of the budgetary ledger 300, according to embodiments of the present invention, thus, may simplify customization of budgetary information by dividing them into smaller independent budgetary ledger areas. This architecture, in turn, may ease the set up and maintenance of the budgetary ledger and allows the operator to define recording conditions in a more user-intuitive manner.

Furthermore, it may also allow the budgetary ledger to easily adapt to multiple reporting requirements imposed by different governments while maintaining the core stable. For example two countries e.g. Spain and the U.S. may institute different yet similar reporting requirements. Embodiments of the present invention may link the core of the budgetary ledger to more than one extension module, one extension configured pursuant to the reporting requirements imposed by the Spanish government and another extension configured to satisfy the reporting requirements of the U.S. government. This allows customers in e.g. Spain and the U.S. to use the same accounting system to fulfill their reporting requirements without modifying the system. Accordingly, embodiments of the present invention may provide a tool that is suited for ready extension to accommodate multiple reporting requirements.

Figure 1:
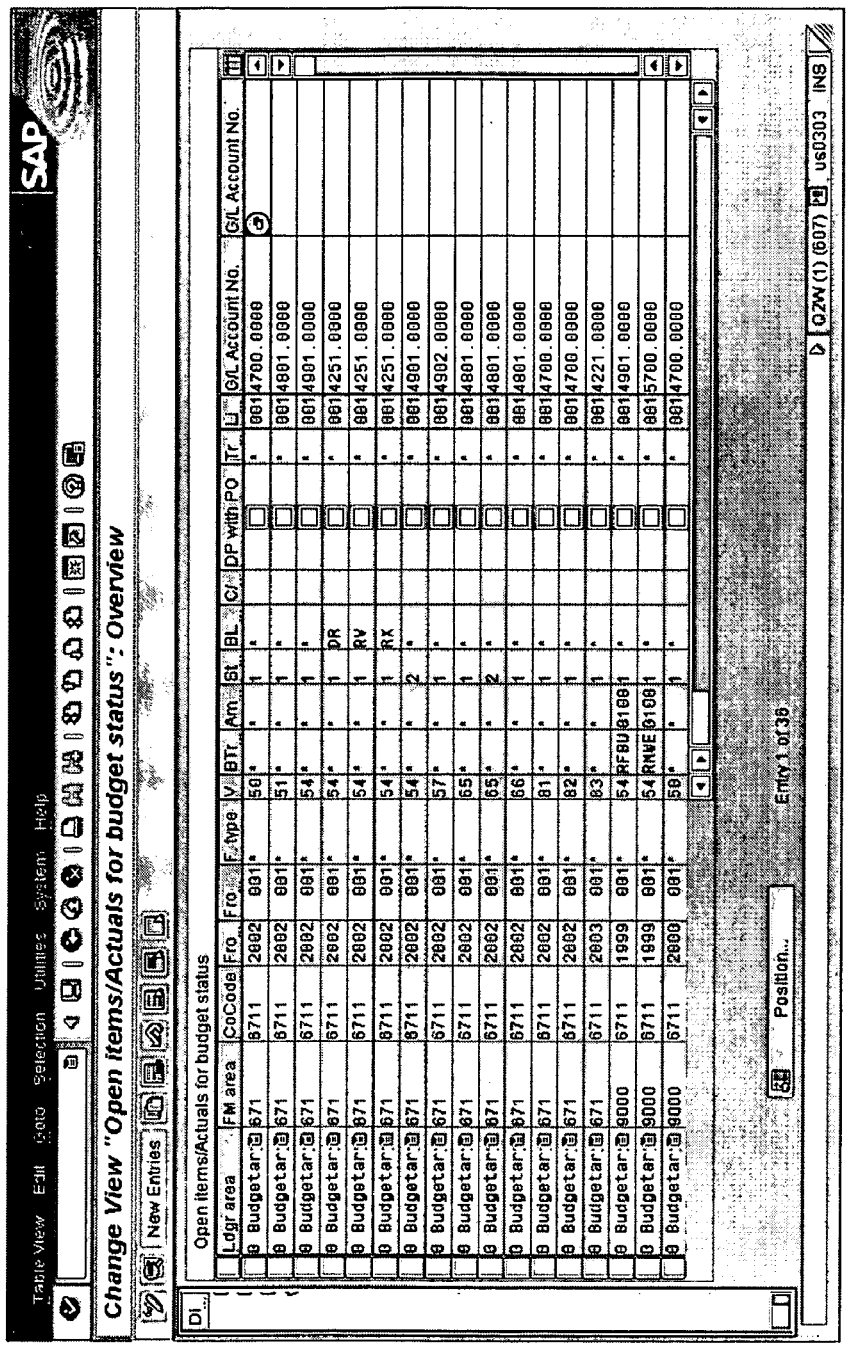
FIG. 1 illustrates an exemplary master configuration table used by a known budgetary ledger.
Figure 7:
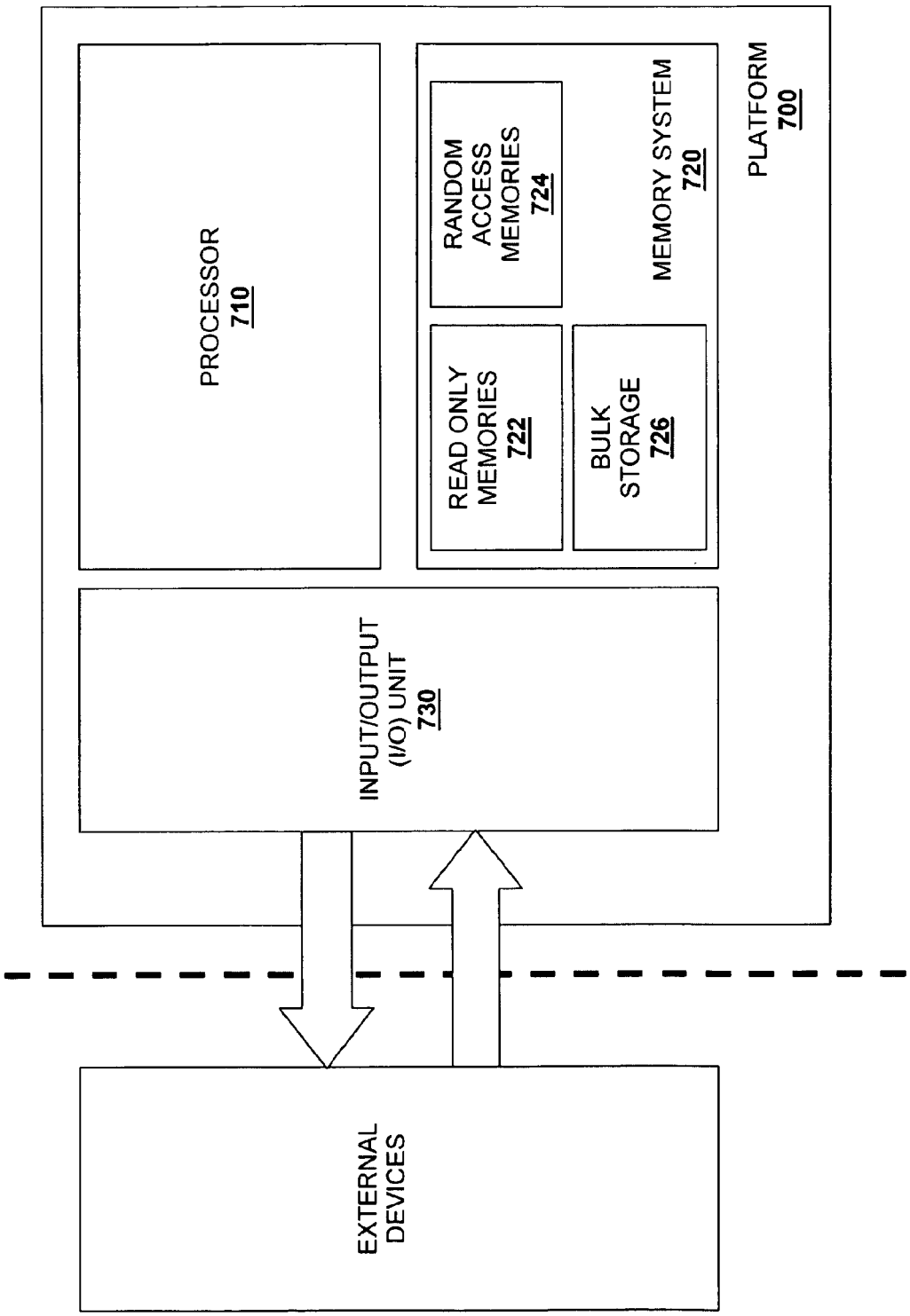
FIG. 7 illustrates a simplified block diagram of a computing platform in an embodiment of the invention.

As noted, the foregoing embodiments may provide a software implemented Enterprise Management Applications ("EMAs"), such as the R/3 application commercially available from SAP AG, permit computer systems to manage the business operations of some of the largest organizations in the world. As such, these embodiments may be represented by program instructions that are to be executed by a server or other common computing platform. One such platform 700 is illustrated in the simplified block diagram of FIG. 7. There, the platform 700 is shown as being populated by a processor 710, a memory system 720 and an input/output (I/O) unit 730. The processor 710 may be any of a plurality of conventional processing systems, including microprocessors, digital signal processors and field programmable logic arrays. In some applications, it may be advantageous to provide multiple processors (not shown) in the platform 700. The processor(s) 710 execute program instructions stored in the memory system. The memory system 720 may include any combination of conventional memory circuits, including electrical, magnetic or optical memory systems. As shown in FIG. 7, the memory system may include read only memories 722, random access memories 724 and bulk storage 726. The memory system not only stores the program instructions representing the various methods described herein but also can store the data items on which these methods operate. The I/O unit 730 would permit communication with external devices, such as the communication network (FIG. 1) and other components.

Throughout the foregoing description, reference has been made to budget relevant processes as "budgetary transactions." This language has been used based on an expectation that doing so makes it easier to explain the principles of the present invention to a lay audience. The principles of the present invention find application in such embodiments, of course, but it is not so limited. The principles of the present invention find application in embodiments that involve other business processes.

Several embodiments of the present invention are specifically illustrated and described herein. However, it will be appreciated that modifications and variations of the present invention are covered by the above teachings and within the purview of the appended claims without departing from the spirit and intended scope of the invention.

We claim:

1. A computerized funds management system, comprising a budgetary ledger unit and a processor:

the budgetary ledger unit including a core and a plurality of extension sets, the core including an instruction for creating an account line pair in a ledger, each extension set including a set of accounts and accounting reporting policies, wherein the extension sets are interchangeable to apply different accounting reporting policies to a financial transaction responsive to a change in a reporting requirement, the different accounting reporting policies specifying different account groups and accounts within an account group associated with the financial transaction; and the processor operative to:

apply a first set of the accounting reporting policies from a selected extension set to financial transaction data to identify an account group associated with the financial transaction data, the financial transaction data extracted from a record of the financial transaction as specified in the applied accounting reporting policies;

apply a second set of the accounting reporting policies pertaining to the identified account group to the financial transaction data to identify at least one account associated with the financial transaction;

create an account line pair for the financial transaction in the ledger; and responsive to the change in the reporting requirement, apply the first and the second sets of accounting reporting policies from an interchanged extension set to the financial transaction data to identify at least one account associated with the changed reporting requirement and create an account line pair based on the changed reporting requirement.

2. The system of claim 1, where each extension set defines accounts and reporting policies for different government agencies.

3. The system of claim 1, where each extension set defines accounts and reporting policies for different nations.

4. The system of claim 1, where the selected extension set is selected by a user.

5. The system of claim 1, where the selected extension set is identified from data contained in the transaction document.

6. The system of claim 1, where the selected extension set is identified from data entered into a user interface tool.

7. The system of claim 1, where the processor selects the extension set for a second set of financial transaction data after creating the accounting line pair for a first set of financial transaction data.

8. The system of claim 1, where the selected extension set varies for different transaction documents.

9. The system of claim 5, where the selected extension set is varied while the computerized funds management system is running.

10. The system of claim 1, further comprising a general ledger to maintain account balances of each account in the selected extension sets.

11. The system of claim 7, where the processor posts the accounting line pair to another financial instrument after creating the account line pair in the general ledger.

12. The system of claim 1, the core further comprising a transaction processor to identify a transaction in the financial transaction requiring reporting, where the accounting reporting policies are applied to the identified transaction requiring reporting.

13. The system of claim 1, each extension set further comprising a budgetary ledger area determiner containing a list of triggering conditions that must be satisfied for a transaction in the financial transaction to be reported in a budgetary ledger area, where the processor verifies that the identified accounts are in the budgetary ledger area satisfying the triggering conditions for the transaction.

14. A computer-implemented process, comprising steps executed by a processor including:
retrieving accounting reporting policies and account information from at least one identified extension set in a budgetary ledger unit,
the budgetary ledger unit including a core and a plurality of extension sets, the core including an instruction for creating an account line pair in a ledger and each extension set including a set of accounts and accounting reporting policies, wherein the extension sets are interchangeable to apply different accounting reporting policies to a financial transaction responsive to a change in a reporting requirement, the different accounting reporting policies specifying different account groups and accounts within an account group associated with the financial transaction;
applying a first set of the accounting reporting policies from a selected extension set to financial transaction data to identify an account group associated with the financial transaction data, the financial transaction data extracted from a record of the financial transaction as specified in the applied accounting reporting policies;
applying a second set of the accounting reporting policies pertaining to the identified account group to the financial transaction data to identify at least one account associated with the financial transaction;
creating an account line pair for the financial transaction in the ledger; and
responsive to the change in the reporting requirement, applying by a processor the first and the second sets of accounting reporting policies from an interchanged extension set to the financial transaction data to identify at least one account associated with the changed reporting requirement and create an account line pair based on the changed reporting requirement.

15. An article of manufacture, comprising a computer readable non-transitory storage medium storing program instructions, that when executed by a processing system, cause the processing system to:
retrieve accounting reporting policies and account information from at least one identified extension set in a budgetary ledger unit,
the budgetary ledger unit including a core and a plurality of extension sets, the core including an instruction for creating an account line pair in a edger and each extension set including a set of accounts and accounting reporting policies, wherein the extension sets are interchangeable to apply different accounting reporting policies to a financial transaction responsive to a change in a reporting requirement, the different accounting reporting policies specifying different account groups and accounts within an account group associated with the financial transaction;
apply a first set of the accounting reporting policies from a selected extension set to financial transaction data to identify an account group associated with the financial transaction data, the financial transaction data extracted from a record of the financial transaction as specified in the applied accounting reporting policies;
apply a second set of the accounting reporting policies pertaining to the identified account group to the financial transaction data to identify at least one account associated with the financial transaction;
create an account line pair for the financial transaction in the ledger; and
responsive to the change in the reporting requirement, apply the first and the second sets of accounting reporting policies from an interchanged extension set to the financial transaction data to identify at least one account associated with the changed reporting requirement and create an account line pair based on the changed reporting requirement.

* * * * *